(12) United States Patent
Song

(10) Patent No.: US 12,423,527 B2
(45) Date of Patent: Sep. 23, 2025

(54) VARIATIONAL GRAPH AUTOENCODING FOR ABSTRACT MEANING REPRESENTATION COREFERENCE RESOLUTION

(71) Applicant: TENCENT AMERICA LLC, Palo Alto, CA (US)

(72) Inventor: Linfeng Song, Bellevue, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 301 days.

(21) Appl. No.: 17/723,969

(22) Filed: Apr. 19, 2022

(65) Prior Publication Data
US 2023/0334259 A1 Oct. 19, 2023

(51) Int. Cl.
G06F 40/30 (2020.01)
G06F 40/35 (2020.01)
G06N 3/0455 (2023.01)
G06N 3/047 (2023.01)
G06N 3/088 (2023.01)

(52) U.S. Cl.
CPC ............. *G06F 40/35* (2020.01); *G06N 3/047* (2023.01); *G06N 3/088* (2013.01)

(58) Field of Classification Search
CPC ...... G06F 40/279; G06F 40/284; G06F 40/30; G06F 40/35; G06N 3/0455
USPC ................. 704/1, 9; 706/12, 27, 55
See application file for complete search history.

(56) References Cited

U.S. PATENT DOCUMENTS

| 9,535,902 | B1 | 1/2017 | Michalak et al. | |
| 11,263,534 | B1* | 3/2022 | Prat | G06F 16/951 |
| 11,288,542 | B1* | 3/2022 | Samplawski | G06N 3/045 |
| 11,687,385 | B2* | 6/2023 | Haldar | G06F 40/30 |
| | | | | 719/318 |
| 11,860,977 | B1* | 1/2024 | Xing | G06N 3/04 |
| 11,916,866 | B2* | 2/2024 | Cheng | G06F 40/30 |

(Continued)

OTHER PUBLICATIONS

Fu et al., "End-to-End AMR Coreference Resolution", Proceedings of the 59th Annual Meeting of the Association for Computational Linguistics and the 11th International Joint Conference on Natural Language Processing, pp. 4204 to 4214, Aug. 1-6, 2021. ( Year: 2021).*

(Continued)

*Primary Examiner* — Martin Lerner
(74) *Attorney, Agent, or Firm* — Sughrue Mion, PLLC

(57) ABSTRACT

A natural language processing method, system, device, and computer readable medium using abstract meaning representation (AMR) coreference resolution. The method can include receiving an input representation, wherein the input representation can include an AMR graph. The method can further include encoding the input representation via a variational graph autoencoder (VGAE). In addition, the method can include determining one or more concept identifiers from the encoded VGAE input representation and determining one or more coreference clusters from the determined concept identifiers. In addition, the method can include determining one or more first embedding values for one or more nodes of the input representation. Further, the step of encoding the input representation can further include encoding one or more nodes of the input representation into a first representation having contextual information via a local graph encoder.

16 Claims, 5 Drawing Sheets

(56) References Cited

U.S. PATENT DOCUMENTS

| | | | |
|---|---|---|---|
| 11,947,503 B2* | 4/2024 | Dai | G06N 3/045 |
| 2020/0291489 A1* | 9/2020 | Baumgarten | G16B 20/00 |
| 2021/0026922 A1* | 1/2021 | Wu | G06F 40/30 |
| 2021/0224610 A1* | 7/2021 | Jha | G06N 3/045 |
| 2021/0240929 A1* | 8/2021 | Fei | G06F 40/30 |
| 2021/0319054 A1* | 10/2021 | Glass | G06N 3/045 |
| 2021/0365306 A1* | 11/2021 | Haldar | G06F 40/205 |
| 2021/0374499 A1* | 12/2021 | Wu | G06N 3/044 |
| 2021/0383228 A1* | 12/2021 | Velickovic | G06F 16/2379 |
| 2022/0076131 A1 | 3/2022 | Rolfe | |
| 2022/0171923 A1* | 6/2022 | Wu | G06F 40/284 |
| 2022/0237377 A1* | 7/2022 | Zhang | G06F 40/284 |
| 2022/0284174 A1* | 9/2022 | Galitsky | G06F 40/30 |
| 2022/0318316 A1* | 10/2022 | Haldar | G06F 40/205 |
| 2023/0087667 A1* | 3/2023 | Dash | G06F 40/30 706/20 |
| 2023/0169325 A1* | 6/2023 | Xie | G06N 3/09 706/15 |
| 2023/0252268 A1* | 8/2023 | Giovannini | G06N 3/0455 706/21 |
| 2023/0306203 A1* | 9/2023 | Hoang | G06F 40/30 |

OTHER PUBLICATIONS

Pothong et al., "Coreference Resolution and Meaning Representation in Legislative Corpus", 2021 16h International Joint Symposium on Artificial Intelligence and Natural Language Processing (ISAI-NLP), Dec. 21-23, 2021, 6 Pages. (Year: 2021).*

Kipf et al., Variational Graph Auto-Encoders, NeurIPS Bayesian Deep Learning Workshop (NIPS 2016), Nov. 21, 2016, 3 Pages. (Year: 2016).*

International Search Report dated Jan. 11, 2023 in International Application No. PCT/US22/43315.

Written Opinion of the International Searching Authority dated Jan. 11, 2023 in International Application No. PCT/US22/43315.

Zixuan Zhang et al., "Abstract Meaning Representation Guided Graph Encoding and Decoding for Joint Information Extraction", Proceedings of the 2021 Conference of the North American Chapter of the Association for Computational Linguistics: Human Language Technologies, 2021, pp. 39-49 (12 pages total).

Irene Li et al., "Efficient Variational Graph Autoencoders for Unsupervised Cross-domain Prerequisite Chains", Efficient Natural Language and Speech Processing (ENLSP) Workshop, 35th Conference on Neural Information Processing Systems, 2021, pp. 1-7 (7 pages total).

* cited by examiner

| Model | In-domain Test Set | | | | Out-domain Test Set | | | |
|---|---|---|---|---|---|---|---|---|
| | MUC | B³ | CEAF_φ4 | Avg. F1 | MUC | B³ | CEAF_φ4 | Avg. F1 |
| Rule-based (Liu et al., 2015) | 50.80 | 41.10 | 22.40 | 38.10 | 53.30 | 41.70 | 25.90 | 40.30 |
| Pipeline (Anikina et al., 2020) | 58.00 | 43.00 | 25.00 | 42.00 | 55.20 | 42.30 | 26.70 | 41.40 |
| AMRCoref (Fu et al., 2021) | 66.10 | 49.70 | 38.10 | 51.30 | 64.40 | 45.80 | 31.40 | 47.20 |
| AMRCoref + bert (Fu et al., 2021) | 72.50 | 64.10 | 50.60 | 62.40 | 69.90 | 61.90 | 48.50 | 60.10 |
| VG-AMRCoref (GRN) | 80.63 | 56.97 | 42.10 | 59.90±0.93 | 62.03 | 46.54 | 42.69 | 50.42±3.28 |
| VG-AMRCoref | 85.96 | 74.01 | 56.29 | 72.08±1.00 | 74.52 | 50.36 | 44.09 | 56.33±2.43 |
| VG-AMRCoref + pretrain | 88.62 | 75.54 | 57.40 | 73.85±1.16 | 78.27 | 55.43 | 52.82 | 62.18±1.79 |
| VG-AMRCoref + pretrain + bert | 90.25 | 76.43 | 53.80 | 73.49±3.28 | 82.89 | 58.59 | 48.97 | 63.48±1.63 |

FIG. 5

VARIATIONAL GRAPH AUTOENCODING FOR ABSTRACT MEANING REPRESENTATION COREFERENCE RESOLUTION

BACKGROUND

Technical Field

The present disclosure described herein relates to a natural language processing method using abstract meaning representation ("AMR") coreference resolution.

Background

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

Abstract meaning representation ("AMR") is a way to preserve the semantic meaning of a sentence in a graph. Further, coreference resolution over semantic graphs, such as AMRs, aim to group graph nodes that represent the same entity, which is a vital step for making document-level formal semantic representations. As shown in FIGS. 2A-2B, AMRs are directed to acyclic graphs wherein the nodes and edges indicate concepts and their semantic relationships. As a sentence-level semantic representation, AMRs have been shown to be effective in many natural language processing ("NLP") type tasks, including text summarization, text generation, information extraction, and machine translation, among others. More recently, NLP tasks that are beyond the single-sentence level are attracting attention, hence, it is important to be able to represent multiple sentences with AMR. To expand AMRs to represent texts at the multi-sentence level, others have proposed the task of AMR coreference resolution. Generally, there was aim to recognize concepts from multiple AMRs that represent the same entity. For example, FIGS. 2A-2B illustrate the AMR graphs of two consecutive sentences in a news article. Given the sentences as the input, an AMR coreference resolver would need to group "police" and "they", as well as "shop" (FIG. 2A) and the implicit mention "shop" (shown with dashed line in FIG. 2B).

Other attempts appear to only consider the nodes that represent entities (e.g., "police" in FIG. 2A), and further relies on string matches to detect coreference. Accordingly, this method can cause errors, as concepts with the same surface string may not point to the same entity. The method also fails to recognize situations that may involve a pronoun (e.g., "police" and "they").

Further there has been building of a pipeline system that uses a textual coreference resolution model and a text-to-AMR aligner. While this system can theoretically resolve many situations, it suffers from severe error propaga-tion. In addition, there has been disclosed an ex-tension of a standard text-based coreference model on AMRs by replacing an LSTM encoder with a graph neural network ("GNN"). In particular, the model shows a performance boost over previous rule-based methods, and their generated document-level AMRs which can help a downstream neural summarization system, demonstrating the potential of this task. However, while annotated data on AMR coreference resolution have shown great potential, such conventional approaches have been data and resource intensive and the annotations have been costly, among other drawbacks.

Hence, what is needed is a new model that expands AMRs to represent texts at the multi-sentence level that minimizes errors or is error-free, cost effective, efficient, and further minimizes computing resource utilization.

BRIEF SUMMARY

In one aspect of the disclosure described herein, a pretraining process is disclosed using a variational graph autoencoder ("VGAE") for abstract meaning representation ("AMR") coreference resolution which can leverage cost-effective approaches and existing supervision signals to make further improvements to AMR coreference resolution. Accordingly, the process disclosed herein can leverage any general AMR corpus and further automatically parse AMR data. Using the process of the disclosure described herein, experiments on benchmarks and conventional processes have shown that the pretraining approach achieves performance gains of up to 6% absolute F1 points. Moreover, the process of the disclosure described herein was shown to significantly improve on previous state-of-the-art models by up to 11% F1.

In another aspect of the disclosure described herein, a pretraining process is disclosed based on VGAE that extends on AMRCoref by replacing the core graph neural network (GNN) with a VGAE encoder module, among others. Hence, the process of the disclosure described herein can leverage the reconstruction loss and variational restriction from the VGAE encoder module as additional supervision at no extra cost or additional computing resource utilization. Accordingly, since the loss by the VGAE process of the disclosure described herein can work on any AMR graph, the process of the disclosure described herein can also be used to pretrain on the full AMR bank with gold annotations and silver automatic parsing results, wherein the full AMR bank can be provided by the Linguistic Data Consortium. Hence, by pretraining on the full AMR bank, the training signal can be further enriched, thus, data hungry and/or intensive issues can be alleviated or minimized.

In another aspect of the disclosure described herein, a natural language processing method using abstract meaning representation (AMR) coreference resolution is disclosed. The method can include receiving an input representation, wherein the input representation can include an AMR graph; encoding the input representation via a variational graph autoencoder (VGAE); determining one or more concept identifiers from the encoded VGAE input representation; and determining one or more coreference clusters from the determined concept identifiers. In addition, the method can include determining one or more first embedding values for one or more nodes of the input representation. The method can also include determining one or more second and third embedding values for the one or more nodes of the input representation. In addition, the step of encoding the input representation can further include encoding one or more nodes of the input representation into a first representation having contextual information via a local graph encoder.

In addition, the method can further include selecting one or more hidden layers from the encoded one or more nodes, wherein the selected one or more hidden layers are at least partially modeled by a Gaussian distribution. Further, the method can include decoding the one or more encoded nodes or the selected one or more hidden layers. The method can also include receiving a first set of information loss related to the encoded input representation via the VGAE. In addition, the first set of information loss can include an edge set loss value and a variational restriction on one or more hidden parameters value.

In another aspect of the disclosure described herein, a computing device is disclosed, comprising at least one memory configured to store computer program code; and at least one processor configured to access the computer program code and operate as instructed by the computer program code. The computer program code can include a first receiving code configured to cause the at least one processor to receive an input representation, wherein the input representation is comprised of an AMR graph; a first encoding code configured to cause the at least one processor to encode the input representation via a variational graph autoencoder (VGAE); a first determining code configured to cause the at least one processor to determine one or more concept identifiers from the encoded VGAE input representation; and a second determining code configured to cause the at least one processor to determine one or more coreference clusters from the determined concept identifiers. In addition, the computing device can also include a third determining code configured to cause the at least one processor to determine one or more first embedding values for one or more nodes of the input representation. Further, the computing device can include a third determining code configured to cause the at least one processor to determine one or more second and third embedding values for the one or more nodes of the input representation. In addition, the first encoding code can be further configured to cause the at least one processor to encode one or more nodes of the input representation into a first representation having contextual information via a local graph encoder.

In addition, the computing device can also include a selecting code configured to cause the at least one processor to select one or more hidden layers from the encoded one or more nodes. Here, the selected one or more hidden layers can be at least partially modeled by a Gaussian distribution. The computing device can further include a decoding code configured to cause the at least one processor to decode the one or more encoded nodes or the selected one or more hidden layers. In addition, the computing device can also include a second receiving code configured to cause the at least one processor to receive a first set of information loss related to the encoded input representation via the VGAE. Here, the first set of information loss comprises an edge set loss value and a variational restriction on one or more hidden parameters value.

In another aspect of the disclosure described herein, a non-transitory computer-readable storage medium storing program instructions is disclosed that cause at least one processor configured to receive an input representation, wherein the input representation is comprised of an AMR graph; encode, via a variational graph autoencoder (VGAE), the input representation; determine one or more concept identifiers to the applied VGAE input representation; and determine one or more coreference clusters from the determined concept identifiers.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which:

FIG. 5 illustrates a table of experimental test results using the VGAE for AMR coreference resolution process of the disclosure described herein as compared to various benchmarks, according to one non-limiting exemplary embodiment of the disclosure described herein.

DETAILED DESCRIPTION

Figure 1:
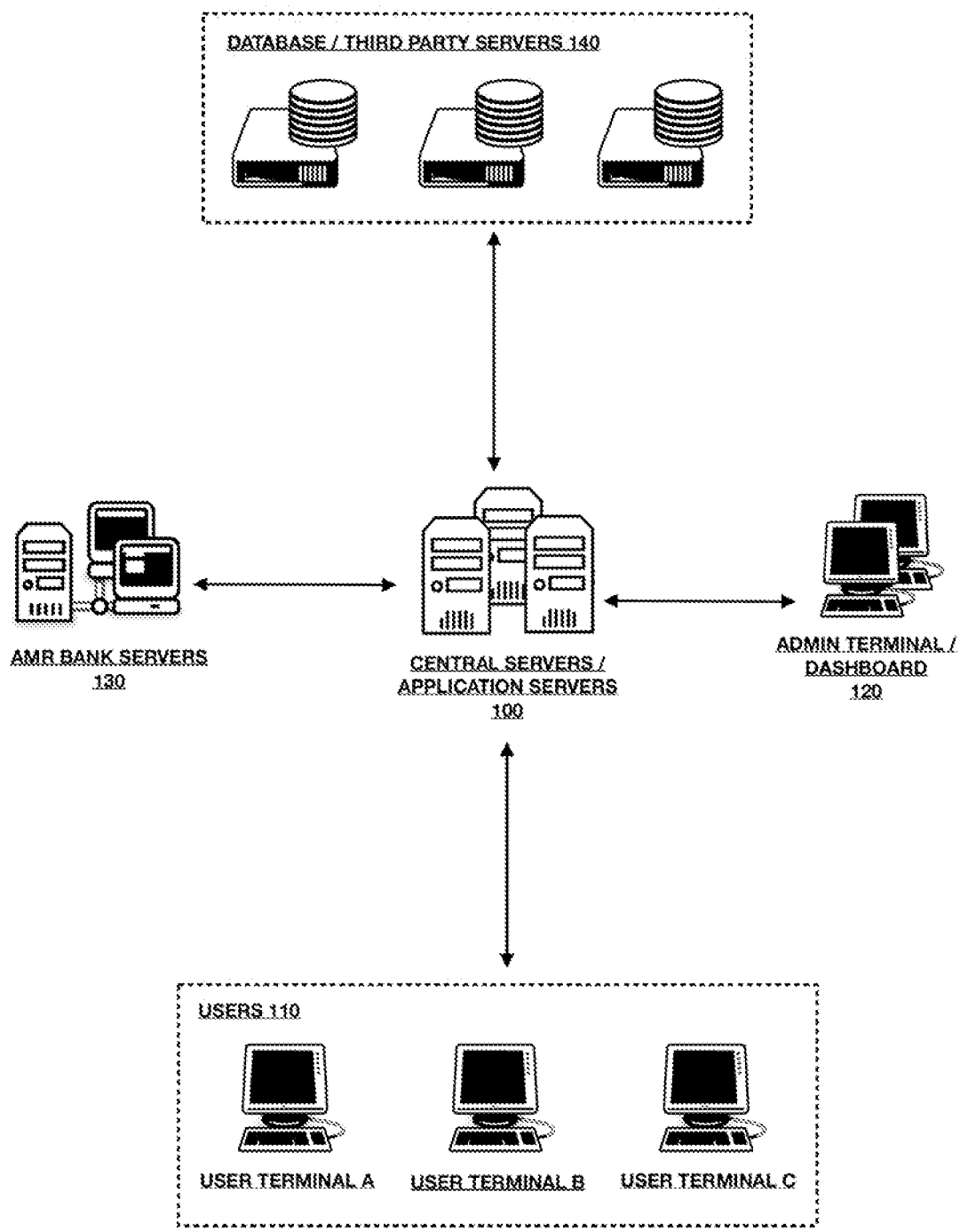
FIG. 1 illustrates a diagram for one non-limiting exemplary embodiment of a general simplified network architecture of the disclosure described herein.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," "non-limiting exemplary embodiment," or similar language means that a particular feature, structure, or characteristic described in connection with the indicated embodiment is included in at least one embodiment of the present solution. Thus, the phrases "in one embodiment", "in an embodiment," "in one non-limiting exemplary embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

In one implementation of the disclosure described herein, a display page may include information residing in the computing device's memory, which may be transmitted from the computing device over a network to a central database center and vice versa. The information may be stored in memory at each of the computing device, a data storage resided at the edge of the network, or on the servers at the central database centers. A computing device or mobile device may receive non-transitory computer readable media, which may contain instructions, logic, data, or code that may be stored in persistent or temporary memory of the mobile device, or may somehow affect or initiate action by a mobile device. Similarly, one or more servers may communicate with one or more mobile devices across a network, and may transmit computer files residing in memory. The network, for example, can include the Internet, wireless communication network, or any other network for connecting one or more mobile devices to one or more servers.

Any discussion of a computing or mobile device may also apply to any type of net-worked device, including but not limited to mobile devices and phones such as cellular phones (e.g., an iPhone®, Android®, Blackberry®, or any "smart phone"), a personal computer, iPad®, server computer, or laptop computer; personal digital assistants (PDAs) such as an Android®-based device or Windows® device; a roaming device, such as a network-connected roaming device; a wireless device such as a wireless email device or other device capable of communicating wirelessly with a computer network; or any other type of network device that may communicate over a network and handle electronic transactions. Any discussion of any mobile device mentioned may also apply to other devices, such as devices including Bluetooth®, near-field communication (NFC), infrared (IR), and Wi-Fi functionality, among others.

Phrases and terms similar to "software", "application", "app", and "firmware" may include any non-transitory computer readable medium storing thereon a program, which when executed by a computer, causes the computer to perform a method, function, or control operation.

Phrases and terms similar to "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also include a network or data links which can be used to carry or store desired program code means in the form of computer-executable instructions or data structures and which can be accessed by a general purpose or special purpose computer.

Phrases and terms similar to "portal" or "terminal" may include an intranet page, internet page, locally residing software or application, mobile device graphical user interface, or digital presentation for a user. The portal may also be any graphical user interface for accessing various modules, components, features, options, and/or attributes of the disclosure described herein. For example, the portal can be a web page accessed with a web browser, mobile device application, or any application or software residing on a computing device.

FIG. 1 illustrates one non-limiting exemplary embodiment of a general network architecture of the network services marketplace platform, process, computing device, apparatus, computer-readable medium, and system of the disclosure described herein. In particular, users 110, including user terminals A, B, and C, can be in bi-directional communication over a secure network with central servers or application servers 100 of the VGAE for AMR coreference resolution network system of the disclosure described herein. In addition, users 110 may also be in direct bi-directional communication with each other via the VGAE for AMR coreference resolution network system of the disclosure described herein. Here, users 110 may be any type of end user. Each of users 110 can communicate with servers 100 via their respective terminals or portals.

Still referring to FIG. 1, central servers 100 of the VGAE for AMR coreference resolution system of the disclosure described herein can be in further bi-directional communication with admin terminal/dashboard 120. Here, admin terminal/dashboard 120 can provide various tools to a user to manage any back-end or back-office systems, servers, applications, processes, privileges, and various end users of the disclosure described herein, or communicate with any of users 110 and servers 100, 130, and 140. Central servers 100 may also be in bi-directional communication with that of AMR bank servers 130, which can include AMR banks for sentences (such as in English or any other language) paired with readable semantic representations, such as provided by the Linguistic Data Consortium. Further, central servers 100 of the disclosure described herein can be in further bi-directional communication with database/third party servers 140. Here, servers 140 can provide various types of data storage (such as cloud-based storage), web services, content creation tools, data streams, data feeds, and/or provide various types of third-party support services to central servers 100 of the VGAE for AMR coreference resolution process and system. However, it is contemplated within the scope of the present disclosure described herein that the VGAE for AMR coreference resolution process and system of the disclosure described herein can include any type of general network architecture.

Still referring to FIG. 1, one or more of servers or terminals of elements 100-140 may include a personal computer (PC), a printed circuit board comprising a computing device, a minicomputer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device.

In some embodiments, as shown in FIG. 1, one or more servers, terminals, and users 100-140 may include a set of components, such as a processor, a memory, a storage component, an input component, an output component, a communication interface, and a JSON UI rendering component. The set of components of the device may be communicatively coupled via a bus.

The bus may comprise one or more components that permit communication among the set of components of one or more of servers or terminals of elements 100-140. For example, the bus may be a communication bus, a cross-over bar, a network, or the like. The bus may be implemented using single or multiple (two or more) connections between the set of components of one or more of servers or terminals of elements 100-140. The disclosure is not limited in this regard.

One or more of servers or terminals of elements 100-140 may comprise one or more processors. The one or more processors may be implemented in hardware, firmware, and/or a combination of hardware and software. For example, the one or more processors may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The one or more processors also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The one or more processors may control overall operation of one or more of servers or terminals of elements 100-140 and/or of the set of components of one or more of servers or terminals of elements 100-140 (e.g., memory, storage component, input component, output component, communication interface, rendering component).

One or more of servers or terminals of elements 100-140 may further comprise memory. In some embodiments, the memory may comprise a random access memory (RAM), a read only memory (ROM), an electrically erasable programmable ROM (EEPROM), a flash memory, a magnetic memory, an optical memory, and/or another type of dynamic or static storage device. The memory may store information and/or instructions for use (e.g., execution) by the processor.

A storage component of one or more of servers or terminals of elements 100-140 may store information and/or computer-readable instructions and/or code related to the operation and use of one or more of servers or terminals of elements 100-140. For example, the storage component may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

One or more of servers or terminals of elements 100-140 may further comprise an input component. The input component may include one or more components that permit one or more of servers and terminals 110-140 to receive information, such as via user input (e.g., a touch screen, a keyboard, a keypad, a mouse, a stylus, a button, a switch, a microphone, a camera, and the like). Alternatively or additionally, the input component may include a sensor for sensing information (e.g., a global positioning system (GPS) component, an accelerometer, a gyroscope, an actuator, and the like).

An output component any one or more of servers or terminals of elements 100-140 may include one or more components that may provide output information from the device 100 (e.g., a display, a liquid crystal display (LCD), light-emitting diodes (LEDs), organic light emitting diodes (OLEDs), a haptic feedback device, a speaker, and the like).

One or more of servers or terminals of elements 100-140 may further comprise a communication interface. The communication interface may include a receiver component, a transmitter component, and/or a transceiver component. The communication interface may enable one or more of servers or terminals of elements 100-140 to establish connections and/or transfer communications with other devices (e.g., a server, another device). The communications may be effected via a wired connection, a wireless connection, or a combination of wired and wireless connections. The communication interface may permit one or more of servers or terminals of elements 100-140 to receive information from another device and/or provide information to another device. In some embodiments, the communication interface may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface may provide for communications with another device via a device-to-device (D2D) communication link, such as FlashLinQ, WiMedia, Bluetooth®, ZigBee, Wi-Fi, LTE, 5G, and the like. In other embodiments, the communication interface may include an Ethernet interface, an optical interface, a coaxial interface, an infrared interface, a radio frequency (RF) interface, or the like.

Figure 2A:
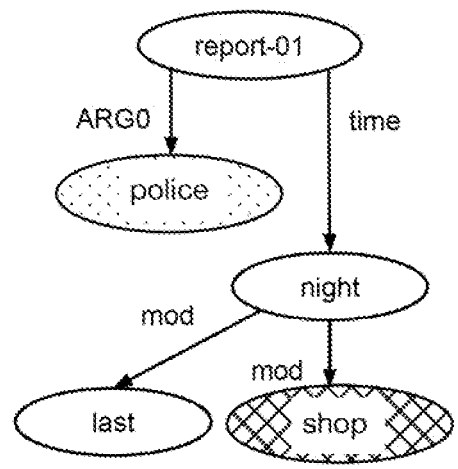
FIG. 2A illustrates a diagram for one non-limiting exemplary embodiment of a multi-sentence AMR coreference resolution graph having two coreference clusters.
Figure 2B:
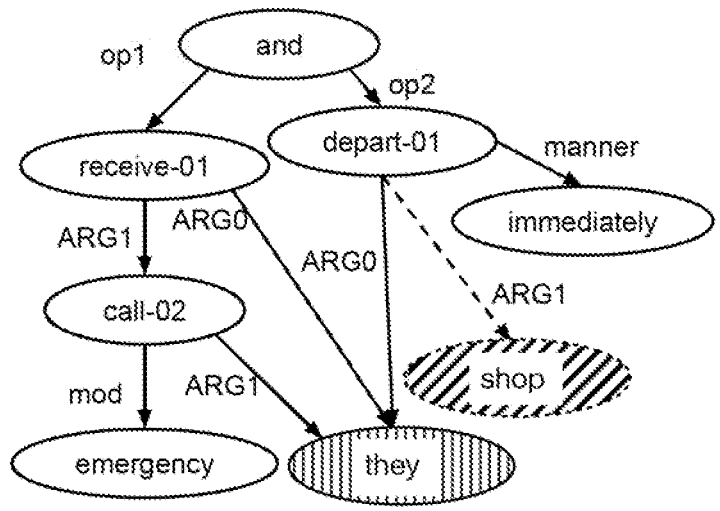
FIG. 2B illustrates a diagram for another non-limiting exemplary embodiment of a multi-sentence AMR coreference resolution graph having two coreference clusters.

FIG. 2A illustrates a diagram for one non-limiting exemplary embodiment of a multi-sentence AMR coreference resolution graph having two coreference clusters. In particular, the semantic representation of FIG. 2A represents the following sentence, namely, "the police reported that a robbery happened in the shop last night," wherein "police" and "shop" are the two coreference clusters. FIG. 2B illustrates a diagram for another non-limiting exemplary embodiment of a multi-sentence AMR coreference resolution graph having two AMR coreference clusters. In particular, the semantic representation of FIG. 2B represents the following sentence, namely, "they received the emergency call and departed immediately," wherein "they" and the implicit mention of "shop" are the two coreference clusters.

Figure 3:
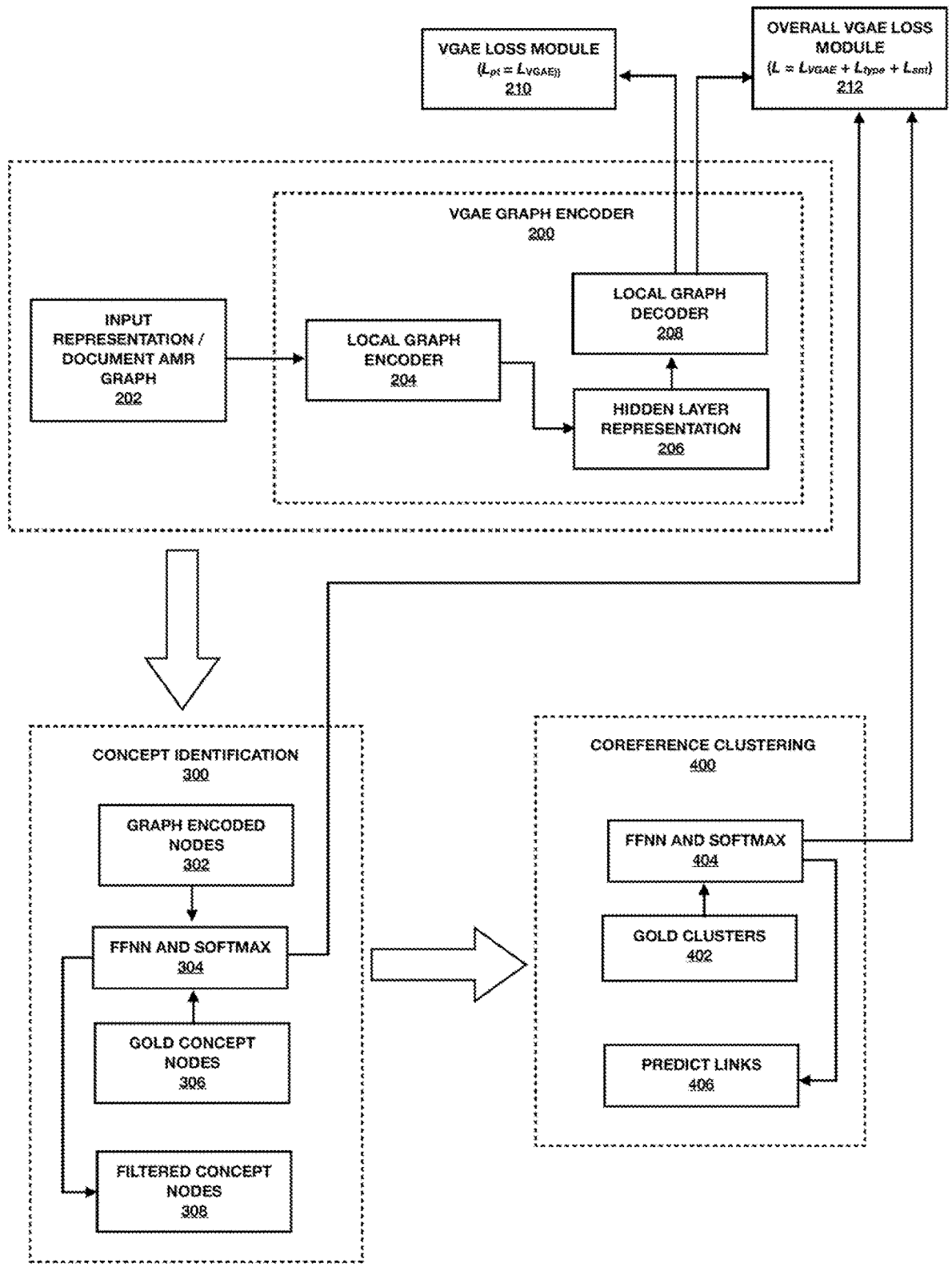
FIG. 3 illustrates a block diagram for one non-limiting exemplary embodiment of a general process flow for the VGAE for AMR coreference resolution of the disclosure described herein.
Figure 4A:
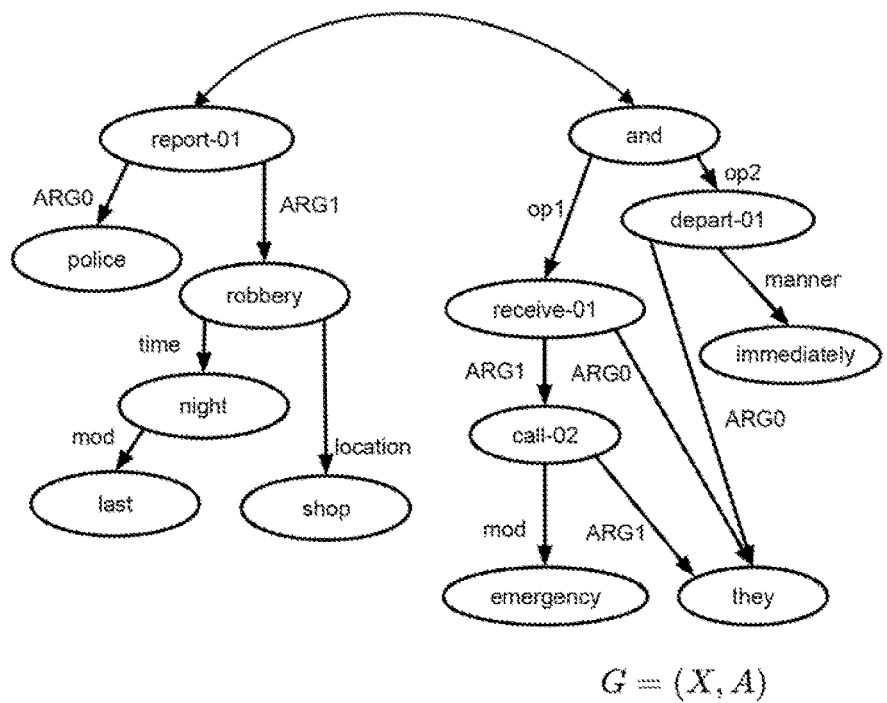
FIG. 4A illustrates a diagram for one non-limiting exemplary embodiment of an input representation for a document AMR graph of the disclosure described herein.
Figure 4B:
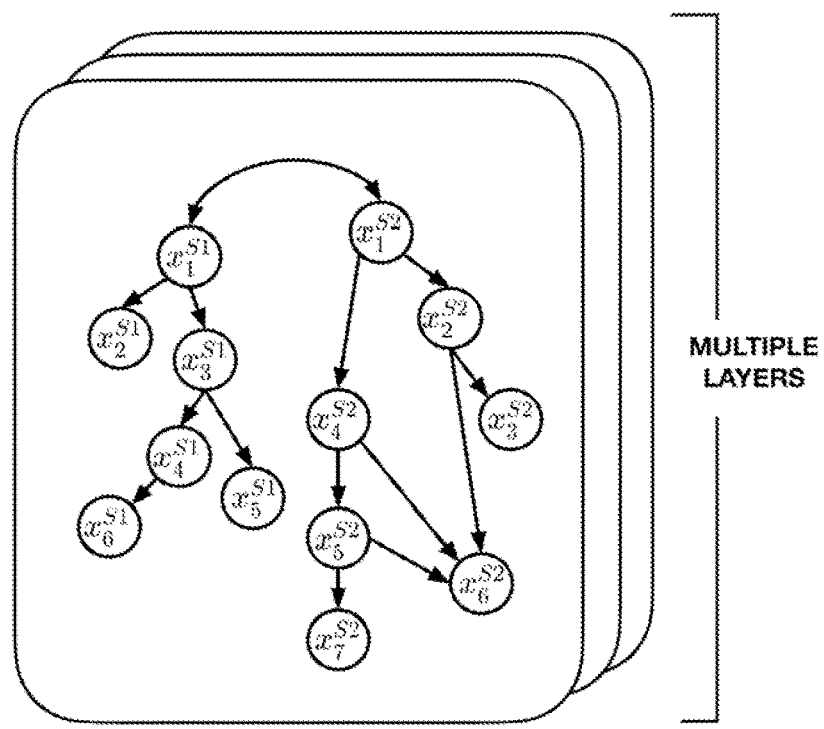
FIG. 4B illustrates a diagram for one non-limiting exemplary embodiment of an AMR node representation of FIG. 4A for a local graph encoder of the disclosure described herein.

FIG. 3 illustrates one non-limiting exemplary embodiment of the VGAE for AMR coreference resolution system, engine, model, algorithm, computer-readable medium, computing device, apparatus, components, modules, and process flow of the disclosure described herein, which can also be referred to herein as "VG-AMRCoref (GRN)," "VG-AMRCoref," "VG-AMRCoref+pretrain," and "VG-AMRCoref+pretrain+bert." In particular, the system and process can include an input representation/document AMR graph module and step 202 that can represent a multi-sentence document with one or more coreference clusters, such as shown in FIG. 4A, for exemplary purposes. The input representation module 202 can be represented and/or encoded by VGAE graph encoder module 200 and a local graph encoder module 204 having multiple AMR nodes xi, such as shown in FIG. 4B, for exemplary purposes. Referring back to the input representation module and step 202, the process can begin by calculating an embedding value $h_i^{(0)}$ for each AMR node xi from its character-level embedding $e_i^c$, token-level embedding $e_i^t$, and fixed embedding $e_i^{bert}$ generated by a pretrained Bidirectional Encoder Representations from Transformers ("BERT" or "bert") model, as represented by the following:

$$h_i^{(0)} = W^{concept}([e_i^c; e_i^t; e_i^{bert}]) + b^{concept},$$

where $W^{concept}$ and $b^{concept}$ are model parameters.

Here, in one embodiment, the character-level and token-level embeddings can be learned from scratch. Further, in other embodiments, the process of the disclosure described herein can also choose to eliminate or not include BERT embedding $e_i^{bert}$ as a simple base model.

Still referring to FIG. 3, the VGAE for AMR coreference resolution system and process can also include a VGAE graph encoder module or step 200 that can include a local graph encoder 204, a hidden layer representation module or step 206, and a local graph decoder module or step 208. Accordingly, at module or step 200, after having obtained the node embeddings and the edge set from the input representation module or step 202, the VGAE graph encoder module or step 206 is applied to further encode the input graph nodes into representations with more contextual information. In particular, the local graph encoder module or step 204 can function as a Graph Neural Network ("GNN"), where the node features in the lth layer can be defined by the following:

$$H^{(l)} = f(H^{l-1}, A)$$

Further, the VGAE model of the disclosure described herein can also apply a Graph Convolutional Network ("GCN") as its local graph encoder $f_{GCN}$, which can be further represented by the following:

$$f_{GCN}(H^{(l)}, A) = \phi\left(\tilde{D}^{-\frac{1}{2}} \tilde{A} \tilde{D}^{-\frac{1}{2}} H^{(l)} W^{(l)}\right)$$

where $\phi(\cdot)$ is the Sigmoid activation function,
$\tilde{A} = A + I$, I is the identity matrix, and
$\tilde{D}$ is the diagonal node degree matrix of $\tilde{A}$.

Here, the foregoing local graph encoder of module 204 can take L layers and further convert them to a hidden layer representation Z or an embedding Z. Next, at the hidden layer representation module or step 206 (Z~q(Z)) the process can choose the hidden layer features after the graph encoding step to be $Z = [H^{(0)}; H^{(L)}]$ for the next step. Here, Z can indicate the stochastic latent variable, and be modeled by a Gaussian prior distribution $\Pi_i N(z_i, 0, I)$, for $z_i \in Z$ which can be represented by the following:

$$q(z_i|X,A) = N(z_i|\mu_i, \text{diag}(\sigma_i^2)),$$

where $\mu = f_\mu(X,A)$ and $\log \sigma = f_\sigma(X,A)$.

After the module or step 206, the process can proceed to the local graph decoder module or step 208, which can be represented by $\hat{A} = \sigma(ZZ^T)$. Next, the loss (i.e., measuring the information lost during reconstruction) from the VGAE module $L_{VGAE}$ or from the VGAE graph encoder module 200 or more specifically from the local graph decoder module 208, can be sent to a VGAE loss module 210. Specifically, the loss $L_{pt} = L_{VGAE}$ can be defined by the reconstruction loss on the edge set $L_{edge}$ and the variational restriction on the hidden parameters $L_{var}$, which can be represented by the following:

$$L_{VGAE} = L_{edge} + L_{var} = E_{q(Z|X,A)}[\log p(A'|Z)] - KL[q(Z|X, A) \| p(Z)],$$

where $KL(\cdot \| \cdot)$ is the Kullback-Leibler divergence.

In particular, the foregoing equation above shows that the VGAE of the disclosure described herein can be trained in a self-supervised way, which may only need node features X and the edge set A. Accordingly, the process and system of the disclosure described herein can pretrain the VGAE graph encoder module 200 using AMR graphs when only AMR graphs are available.

Still referring to FIG. 3, after the VGAE graph encoder module or step 200, the process can proceed to the concept identification module or step 300 for distinguishing AMR nodes with respect to their concept type. Accordingly, at the graph encoded nodes module or step 302 (Z), the nodes from the hidden layer representation are sent to a feed-forward neural network ("FFNN") and softmax function module or step 304. In particular, module 304 can also receive gold concept nodes from module or step 306, such as gold AMR annotations from the AMR bank. Next, the result of module 304 can be sent to the filtered concepts or nodes module 308 (S). Next, after the concept identification module 300, the filtered concepts or nodes can then be sent to the coreference clustering module 400 of the disclosure described herein. Here, the coreference clustering module 400 can include another FFNN and softmax function module or step 404 which can receive the filtered concepts or nodes, in addition to gold clusters from the gold clusters module or step 402. After module or step 404, the process can then move to the predicting links module or step 406, wherein concepts are selected as candidate nodes for antecedent prediction or coreference link prediction. Here, the final predicted coreference links can determine the coreference clusters.

Still referring to FIG. 3, the FFNN and softmax modules 304 and 404 can each further send their loss to the overall VGAE loss module 212. In particular, the overall loss (L) can be represented by the following:

$$L = L_{VGAE} + L_{type} + L_{ant},$$

where $L_{VGAE}$ represents VGAE loss, $L_{type}$ represents concept type loss, and $L_{ant}$ represents and the coreference clustering loss.

FIG. 5 illustrates a table of experimental results using the disclosed VGAE for AMR coreference resolution with respect to conventional methods or benchmarks. Specifically, the conventional methods or benchmarks are represented by the following processes, systems, or models: "Rule-based (Liu et al., 2015)," "Pipeline (Anikina et al., 2020)", "AMRCoref (Fu et al., 2021)", and "AMRCoref+bert (Fu et al., 2021)." In contrast, the VGAE for AMR coreference resolution system and process of the disclosure described herein are represented by the following processes, systems, or models: "VG-AMRCoref (GRN)," "VG-AMR-Coref," "VG-AMRCoref+pretrain," and "VG-AMRCoref+pretrain+bert." In addition, the experiments for each process, system, or model are based on both an in-domain test set and also an out-domain test set. In addition, for each test set, the following criterias or categories were scored, which can be represented by a percentage (%), namely: MUC, $B^3$, $CEAF_{\phi 4}$, and Average F1. As shown herein, even with the simple model of VG-AMRCoref, the process of the disclosure described herein scored significantly higher relative to the conventional models or benchmarks in each category, whether it was for an in-domain test set or out-of-domain test set. In particular, the VG-AMRCoref+pretrain (i.e., the VGAE base model in addition to a pretraining) achieved the highest average F1 score of 73.85 from the in-domain test set, whereas the VG-AMRCoref+pretrain+bert (i.e., the VGAE base model in addition to pretraining and BERT) achieved the highest average F1 score of 63.48 from the out-domain test set. Accordingly, the experimental test results of FIG. 5 illustrate significant improvement over conventional AMR coreference resolution models or processes, in addition to improved cost-effectiveness, less resource utilization, and reduced or minimal result error or predicted link error.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A natural language processing method using abstract meaning representation (AMR) coreference resolution, the method performed by at least one processor and comprising:
   receiving an input representation, wherein the input representation is comprised of an AMR graph;
   encoding the input representation via a variational graph autoencoder (VGAE) pretrained using at least AMR graphs other than the AMR graph;
   determining one or more concept identifiers from the encoded VGAE input representation; and
   determining one or more coreference clusters from the determined concept identifiers; and
   receiving a first set of an information loss related to the encoded input representation via the VGAE and based on embeddings for each AMR node, a plurality of character-level embeddings, one or more token-level embeddings, and a fixed embedding generated by a pretrained bidirection encoder representations from transformers (BERT) model,
   wherein the information loss depends on a Kullback-Leibler divergence,
   wherein the first set of the information loss comprises an edge set loss value and a variational restriction on one or more hidden parameter values, and
   wherein the information loss is $L_{VGAE}=L_{edge}+L_{var}=E_{q(Z|X,A)}[\log p(A'|Z)]-KL[q(Z|X,A)\|p(Z)]$, of which
   A' represents a value defined by an identity matrix,
   X represents a variable of a Gaussian prior distribution of Z which indicates a stochastic latent variable,
   $KL(\cdot\|\cdot)$ represents the Kullback-Leibler divergence,
   the edge set loss value is represented as $L_{edge}$, and
   the variational restrictions are represented as $L_{var}$.

2. The method of claim 1, further comprising:
   determining one or more first embedding values for one or more nodes of the input representation.

3. The method of claim 2, further comprising:
   determining one or more second and third embedding values for the one or more nodes of the input representation.

4. The method of claim 1, further comprising:
   encoding one or more nodes of the input representation into a first representation having contextual information via a local graph encoder.

5. The method of claim 4, further comprising:
   selecting one or more hidden layers from the encoded one or more nodes.

6. The method of claim 5, wherein the selected one or more hidden layers are at least partially modeled by a Gaussian distribution.

7. The method of claim 5, further comprising:
   decoding the one or more encoded nodes or the selected one or more hidden layers.

8. A computing device, comprising:
   at least one memory configured to store computer program code; and
   at least one processor configured to access the computer program code and operate as instructed by the computer program code, the computer program code comprising:
   first receiving code configured to cause the at least one processor to receive an input representation, wherein the input representation is comprised of an AMR graph;
   first encoding code configured to cause the at least one processor to encode the input representation via a variational graph autoencoder (VGAE) pretrained using at least AMR graphs other than the AMR graph;
   first determining code configured to cause the at least one processor to determine one or more concept identifiers from the encoded VGAE input representation; and
   second determining code configured to cause the at least one processor to determine one or more coreference clusters from the determined concept identifiers,
   further receiving code configured to cause the at least one processor to receive a first set of an information loss related to the encoded input representation via the VGAE and based on embeddings for each AMR node, a plurality of character-level embeddings, one or more token-level embeddings, and a fixed embedding generated by a pretrained biderection encoder representations from transformers (BERT) model, wherein the information loss depends on a Kullback-Leibler divergence, wherein the first set of the information loss comprises an edge set loss value and a variational restriction on one or more hidden parameter values, and wherein the information loss is $L_{VGAE}=L_{edge}+L_{var}=E_{q(Z|X,A)}[\log p(A'|Z)]-KL[q(Z|X,A)\|p(Z)]$, of which A' represents a value defined by an identity matrix, X represents a variable of a Gaussian prior distribution of Z which indicates a stochastic latent variable, KL (·∥·) represents the Kullback-Leibler divergence, the edge set loss value is represented as $L_{edge}$, and the variational restrictions are represented as $L_{var}$.

9. The computing device according to claim 8, further comprising:

third determining code configured to cause the at least one processor to determine one or more first embedding values for one or more nodes of the input representation.

10. The computing device of claim 9, further comprising:

third determining code configured to cause the at least one processor to determine one or more second and third embedding values for the one or more nodes of the input representation.

11. The computing device of claim 8, wherein the first encoding code is further configured to cause the at least one processor to:

encode one or more nodes of the input representation into a first representation having contextual information via a local graph encoder.

12. The computing device of claim 11, further comprising:

selecting code configured to cause the at least one processor to select one or more hidden layers from the encoded one or more nodes.

13. The computing device of claim 12, wherein the selected one or more hidden layers are at least partially modeled by a Gaussian distribution.

14. The computing device of claim 13, further comprising:

decoding code configured to cause the at least one processor to decode the one or more encoded nodes or the selected one or more hidden layers.

15. A non-transitory computer-readable storage medium storing program instructions that cause at least one processor to:

receive an input representation, wherein the input representation is comprised of an AMR graph;

encode, via a variational graph autoencoder (VGAE), the input representation pretrained using at least AMR graphs other than the AMR graph;

determine one or more concept identifiers to the encoded VGAE input representation;

determine one or more coreference clusters from the determined concept identifiers; and receive a first set of an information loss related to the encoded input representation via the VGAE and based on embeddings for each AMR node, a plurality of character-level embeddings, one or more token-level embeddings, and a fixed embedding generated by a pretrained biderection encoder representations from transformers (BERT) model, wherein the information loss depends on a Kullback-Leibler divergence, wherein the first set of the information loss comprises an edge set loss value and a variational restriction on one or more hidden parameter values, and wherein the information loss is $L_{VGAE}=L_{edge}+L_{var}=E_{q(Z|X,A)}[\log p(A'|Z)]-KL[q(Z|X,A)\|p(Z)]$, of which A' represents a value defined by an identity matrix, X represents a variable of a Gaussian prior distribution of Z which indicates a stochastic latent variable, KL (·∥·) represents the Kullback-Leibler divergence, the edge set loss value is represented as $L_{edge}$, and the variational restrictions are represented as $L_{var}$.

16. The non-transitory computer-readable storage medium according to claim 15, wherein the program instructions further cause the at least one processor to determine one or more first embedding values for one or more nodes of the input representation.

* * * * *